United States Patent Office
3,824,214
Patented July 16, 1974

---

3,824,214
HALOVINYLIDENE ARYLENE POLYMERS AND PROCESS FOR MAKING THE SAME
Tohru Takakoshi, Scotia, N.Y., assignor to General Electric Company
No Drawing. Filed Mar. 20, 1973, Ser. No. 343,139
Int. Cl. C08g 5/00
U.S. Cl. 260—52                 12 Claims

ABSTRACT OF THE DISCLOSURE

Halovinylidene arylene polymers are prepared from the dihydrohalogenation of the polymeric reaction product of an aromatic compound containing nuclearly-bonded hydrogen and either chloral or bromal, in the presence of a strong acidic catalyst.

---

This invention is concerned with halovinylidene arylene polymers and methods for making the same. More particularly, the invention relates to a polymeric composition composed of recurring structural units of the formula I
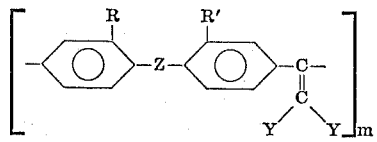

where R and R′ are members selected from the class consisting of hydrogen, halogen (e.g., chlorine, bromine, fluorine, etc.) and the methyl radical, Z is a direct bond or is a member selected from the class consisting of —O—, —S—, divalent alkyl hydrocarbon radicals of from 1 to 4 carbon atoms, the $$-O-\left[(CH_2)_n-O-\right]_q$$

radical, and divalent radicals of the general formula

II
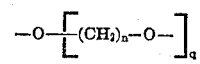

where Y is chlorine or bromine, Q is a member of the class of —O—, —S—, —SO$_2$—, >C=O and divalent alkyl radicals of from 1 to 4 carbon atoms, $m$ is a whole number in excess of 1, for instance, 10 to 1000 or more, and $n$ and $q$ are whole numbers from 1 to 2, inclusive.

The invention is also concerned with a process for making the aforesaid polymers of formula I which comprises dehydrohalogenating a precursor polymer composed of recurring structural units of the formula III
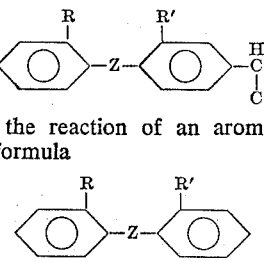

obtained from the reaction of an aromatic compound of the general formula

IV

with a carbonyl compound of the formula

V

in the presence of a strongly acidic catalyst, where R, R′, Y, Z, and $m$ have the meanings given above.

In the copending application of Jimmy L. Webb and myself, Ser. No. 343,138, filed concurrently herewith and assigned to the same assignee as the present invention, are disclosed and claimed polymers corresponding to formula III where R, R′, Z, Y and $m$ have the meanings given above. These compositions are obtained by effecting reaction between an aromatic compound containing nuclearly-bonded hydrogen with either chloral or bromal in the presence of a strong, acidic catalyst whose acid strength, as measured on the Hammett H$_0$ scale, is at least as strong as trifluoroacetic acid. Among such catalysts may be mentioned trifluoroacetic acid, trifluoroacetic anhydride, methanesulfonic acid, trifluoromethanesulfonic acid, trifluoromethanesulfonic anhydride, difluorophosphoric acid, hydrogen fluoride, boron trifluoride, etc.

In accordance with the description found in the aforesaid application, Ser. No. 343,138, among the aromatic compounds which can be employed are, for instance, diphenyl oxide, diphenyl sulfide, diphenylmethane, 1,3-diphenoxypropane, 4,4′ - diphenoxybenzophenone, etc., as well as the many other aromatic compounds of formula IV recited in the aforesaid copending patent application.

In addition, Z can be a divalent radical of the general formula

VI
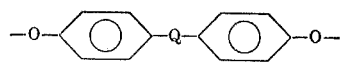

where Q is a member of the class of —O—, —S—, —SO$_2$—,

and divalent alkyl radicals of from 1 to 4 carbon atoms. Among the radicals of the type which Z can represent are, for instance,

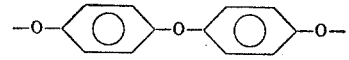

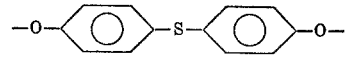

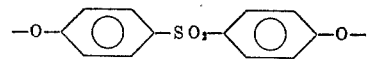

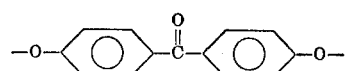

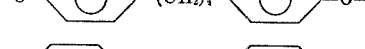

Many other aromatic compounds containing nuclearly-bonded hydrogen identified by formula IV and the strong acidic catalysts which may be employed, together with the conditions for preparing the polymers of formula III are found disclosed in the aforesaid copending application, which by reference is made, with all of its disclosures and teachings, part of the disclosures and teachings in the instant application.

The polymers obtained in the aforesaid copending application are high molecular weight, linear compositions capable of forming strong films and capable of being molded to form useful products in the molding and insulation and protective arts. These particular polymers, especially those derived from chloral and bromal, have excellent flame resistant properties generally characterized by non-dripping, self-extinguishing and low smoke generation. However, when applications are employed for these halogenated polymers requiring temperatures above 250° C., it has been found that there is a reduction in the stability of these polymers. This does not mean, however, that they do not have extensive applications at temperatures below 250° C.

I have now discovered that by dehydrohalogenating the polymers of formula III I can obtain, almost quantitatively, poly(dihalovinylidenearylene) polymers of the general formula I. These latter polymers are extremely stable thermally, and retain the excellent flame-retardant properties of the precursor polymers as well as the mechanical properties thereof. In addition, I have unexpectedly found that these dehydrohalogenated polymers are exceptionally flame resistant, are self-extinguishing and do not drip but rather form a stable char during burning. In addition, oxygen indices of these polymers are unusually high and show exceptionally low maximum smoke density values.

In accordance with my invention, a polymer of formula III is subjected to dehydrohalogenation conditions such that HCl is removed to form the poly(dihalovinylidenearylene) polymer. Generally, the dehydrohalogenation is accomplished by the use of various amines, particularly tertiary organic amines, ordinarily in quantitative molar concentrations. However, it has been found that small amount approaching catalytic amounts, of the diamine can be used thus contributing to the economy of making these dehydrohalogenated polymers, by employing in combination with the amine, inorganic bases. Among the tertiary diamines which may be used for the purpose are, for instance, the following:

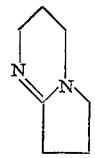

1,5-Diazabicyclo[4.3.0]non-5-ene
(DBN)

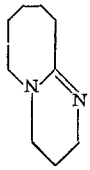

1,5-Diazabicyclo[5.4.0]undec-5-ene
(DBU)

In addition to the tertiary amines may also be mentioned, for instance, tetramethylbutylenediamine, tetraethylpropylenediamine, pyridine, quinoline, the picolines, tetrabutyl butylene diamine, etc.

Among the inorganic bases which may be employed with such tertiary diamines are, for instance, sodium carbonate, potassium carbonate, sodium oxide, sodium bicarbonate, lithium carbonate, sodium hydroxide, potassium hydroxide, etc.

When the diamine is employed as the dehydro-halogenation reagent alone, it will be necessary to employ the diamine in a molar concentration equal to the mols of hydrogen halide to be removed. However, with the use of the inorganic base, only catalytic amounts of the diamine are generally employed usually from 0.01 to about 10%, by weight, of the diamine based on the weight of the polymer undergoing dehydrohalogenation.

The amount of inorganic base used can be varied widely and is not critical. Since it is relatively inexpensive, the inorganic base can be present in amounts ranging from 10 to 50 weight percent, based on the weight of the polymer undergoing dehydrohalogenation. The base should be present in an amount sufficient to neutralize the evolving HCl.

The temperatures under which the dehydrohalogenation process occurs can also be varied widely. This is generally carried out at the reflux temperature of the mixture of the polymer being dehydrohalogenated, the tertiary diamine, and the inorganic base, together with any inert solvent. Temperatures ranging from about 100 to 250° C. are advantageously employed for this purpose using times ranging from about one hour to 20 hours or more, depending on the polymer undergoing dehydrohalogenation, the tertiary diamine, the inorganic base, etc. It will be understood that in addition to atmospheric pressure, subatmospheric pressures and superatmospheric pressures can also be employed depending on the conditions and ingredients used.

Generally, common inert solvents (i.e., inert to the reactants and reaction product) are advantageously employed in the practice of the invention. Among such solvents may be mentioned, for instance, benzene, toluene, xylene, chlorobenzene, trichloroethylene, orthodichlorobenzene, anisole, benzyl alcohol, etc. Although solvents are not absolutely essential, it has been found that the solvent (which can vary widely in concentration) acts as a diluent to reduce the viscosity and medium for more intimate contact between the reactants. Also, it is possible by the use of solvents to maintain better control of the reaction which is often exothermic. Mixtures of solvents can also be employed. In general, the amount of solvent can vary from 10 to 100%, or more, by weight, based on the weight of the polymer undergoing dehydrohalogenation.

Once the dehydrohalogenation is carried out, the reaction is usually terminated by pouring the reaction mixture into a suitable non-solvent for the polymer, such as methanol. The polymer which generally precipitates, can be removed by filtration, washed with additional methanol, and then dried in vacuum at temperatures ranging from about 50 to 80° C. Redissolving the polymer in solvents therefor, such as chloroform, and reprecipitation with methanol will give still purer, less colored polymers.

In order that those skilled in the art may better understand how the present invention may be practiced, the following examples are given by way of illustration and not by way of limitation. Anhydrous conditions were used throughout unless otherwise stated.

The oxygen index flammability test described herein measures the minimum volume concentration of oxygen required to support combustion. This minimum value is identified as the critical or limiting oxygen index and can be determined to an accuracy of 1% or less. The higher the oxygen index of a material, the better its flame resistance. The equipment used to measure the oxygen index consists of (1) a flame holder assembly, in which samples are clamped vertically inside a glass chimney, (2) a metering device which controls the flow of oxygen and nitrogen fed to the flame holder assembly, and (3) a pistol-type igniter gun with which the sample is ignited. The sample is placed in the assembly, ignited well and allowed to burn. The critical oxygen percentage is that amount which will just allow the sample to burn for three minutes or just not allow the sample to burn three inches. A more particular description of this test is found in ASTM D-2863-70.

The intrinsic viscosities [$\eta$] in the examples and tables were measured at 25° C. in chloroform unless otherwise indicated. The temperature at which 5% weight loss occurred at a heating rate of 10° C./minute is identified as "TD." The glass transition temperature ($T_g$) was measured by differential scanning calorimetry.

Example 1

To a reaction vessel were added about 3.59 grams (0.024 mol) chloral, 5.90 grams (0.024 mol) 1,2-bis(2-methylphenoxy) ethane and 80 ml. nitrobenzene. The mixture was cooled to 14° C. and 18.34 grams of hydrogen fluoride was added. The mixture was stirred at room temperature and after one hour an additional 12.63 grams hydrogen fluoride was added at which time the stirring was continued at 14° C. for 20 hours. The polymer was then precipitated with methanol, dissolved in $CHCl_3$ and reprecipitated with methanol several times, and then dried to yield a polymer composed of recurring structural units of the formula VII 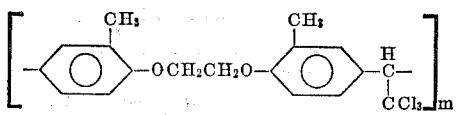

where *m* is a whole number greater than 1.

Example 2

About 165.74 grams of a polymer as obtained in Example 1, having an intrinsic viscosity of 0.52 dl./g. in chlorobenzene, was dissolved in 1,650 ml. toluene. About 50 grams finely pulverized anhydrous sodium carbonate and 1.0 ml. of the DBU were added to the above polymer solution. The mixture was stirred vigorously under a nitrogen atmosphere and heated to the reflux temperature of the mass. The water which formed was continuously eliminated by means of a Dean-Stark condenser. For the next 20 hours, eight 50 gram portions of sodium carbonate were added intermittently to the reaction mixture after which time the dehydrochlorination reaction was more than 90% complete. About 25 additional grams of sodium carbonate was added and the reaction mixture was further refluxed for an additional 8 hours at which time it was found by nmr spectrum, that the reaction was essentially complete. The reaction mixture was cooled, the precipitate which was present was removed and washed with toluene. The combined filtrate and washed solution were then added to methanol causing precipitation of the desired polymer which was dried under vacuum at 60° C. This resulted in 140.61 grams (about 95.5% yield) of the dichlorovinylidene polymer which had an intrinsic viscosity of 0.61 dl./g. in chlorobenzene. This polymer which was composed of recurring structural units of the formula VIII 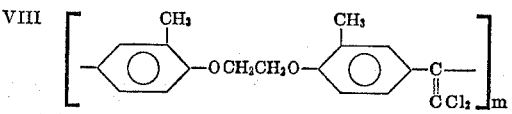

where *m* is a whole number greater than 1 was substantiated in its structure by the following analyses:

|  | Found | Calculated |
|---|---|---|
| Percent: |  |  |
| C | 64.2 | 64.48 |
| H | 4.9 | 4.82 |
| Cl | 20.9 | 21.35 |

Example 3

10.985 grams (0.048 mol) 1-phenoxy-2-(2-methylphenoxy) ethane, 7.091 grams (0.048 mol) chloral, and 150 ml. nitrobenzene were placed in a reaction vessel under a nitrogen atmosphere, cooled to about 10° C. and BF$_3$ gas introduced into the mixture at the rate of approximately 1 ml./sec. for 40 minutes during which time the viscosity of the reaction mixture increased greatly. The polymerization was terminated by pouring the reaction mixture into methanol and the polymer which precipitated was isolated and washed in pulverized form with methanol, filtered and dried in vacuum at 60° C. to give 16.1 grams of a polymer composed of recurring structural units of the formula IX 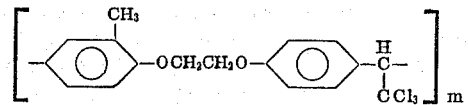

where *m* is a whole number greater than 1. This polymer had an intrinsic viscosity of 0.43 dl./g. in chloroform.

The structure of the polymer was identified by the following analysis:

|  | Found | Calculated |
|---|---|---|
| Percent: |  |  |
| C | 56.9 | 57.08 |
| H | 4.5 | 4.23 |
| Cl | 29.0 | 29.73 |

Example 4

About 9.80 grams of the above-identified polymer of Example 3 was dehydrohalogenated in the same manner as was done in Example 2 using 0.1 ml. of DBU, 16 grams sodium carbonate, 125 ml. toluene, and 25 ml. chlorobenzene. The total reaction time was 22.5 hours and the yield of the dichlorovinylidene polymer was 8.55 grams (97.1% yield). The intrinsic viscosity of this polymer was 0.46 dl./g. when measured in chlorobenzene. This polymer was composed of recurring structural units of the formula

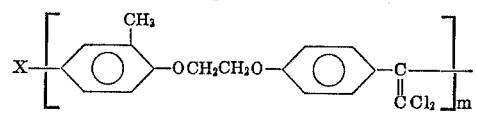

where *m* is a whole number greater than 1. The structure of the polymer was established by the following analyses.

|  | Found | Calculated |
|---|---|---|
| Percent: |  |  |
| C | 63.3 | 63.56 |
| H | 4.6 | 4.40 |
| Cl | 21.9 | 22.07 |

Example 5

A polymer was prepared similarly as in Example 1 from 1,2-diphenoxyethane and chloral using nitrobenzene as the solvent and BF$_3$ gas as a catalyst. This polymer was obtained by heating the mixture of ingredients for a period of 2.5 hours at about 10° C. The polymer had an intrinsic viscosity of 0.55 dl./g. when measured in chloroform. This polymer which was composed of recurring structural units of the formula XI 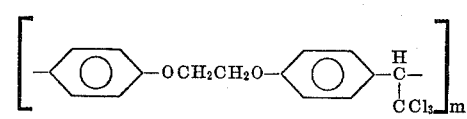

where *m* is a whole number greater than 1, was dehydrochlorinated similarly as in Examples 2 and 4 employing 25.62 grams of the polymer, 200 ml. toluene, 75 ml. chlorobenzene, 40 grams sodium carbonate and 0.2 ml. of DBU. The total reaction time was 14 hours. When the reaction mixture was cooled, the polymer which precipitated, was filtered, washed with methanol and dried. The precipitate was extracted with hot water to remove the salts and then with a hot 1% aqueous acetic acid. It was finally washed twice more in hot water and dried under vacuum. Again, the polymer was dissolved in boiling toluene and filtered hot. On cooling the filtrate, the pure polymer precipitated; the precipitate was removed, washed in methanol and dried to give 10.03 grams of a polymer composed of recurring structural units of the formula XII 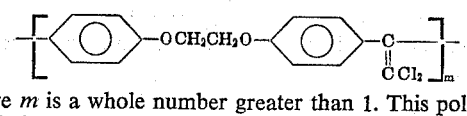

where *m* is a whole number greater than 1. This polymer, which had an intrinsic viscosity in o-dichlorobenzene at 120° C. of 0.52 dl./g. was analyzed for elemental analyses in accordance with the following results:

|  | Found | Calculated |
|---|---|---|
| Percent: |  |  |
| C | 62.25 | 62.56 |
| H | 4.1 | 3.95 |
| Cl | 23.1 | 23.08 |

Example 6

When 5.12 grams of the 1,2-diphenoxyethanechloral polymer of formula XI was dehydrohalogenated, this time by dissolving the polymer in 55 ml. anhydrous pyridine and heating the solution to reflux under a nitrogen atmosphere for 21 hours, and then pouring the resultant mixture into a mixture of water and methanol (at a weight ratio of 1:9), this yielded a precipitate of a polymer weighing about 4.01 grams (88.9% yield) and being composed of recurring structural units of formula XII.

Example 7

About 20.9 grams (0.13 mol) chloral hydrate and 20 ml. trifluoroacetic acid were placed in a reaction vessel equipped with nitrogen inlet, condenser, stirrer, thermometer, addition funnel and a gas inlet tube. Thereafter, under a nitrogen blanket, 26.5 grams (0.013 mol) trifluoroacetic anhydride (TFAA) was added dropwise through the addition funnel over a period of one-half hour. Diphenyl ether in an amount equal to 21.48 grams (0.13 mol) and 60 ml. 1,1,2,2-tetrachloroethane were added and the solution heated at 70° C. for about 2½ hours. After cooling to room temperature, additional TFAA (20 grams, 0.095 mol) was added dropwise over a period of 0.5 hour. $BF_3$ gas was then bubbled into the solution at the rate of one bubble per second for one hour and the solution heated at 70° C. for about 8 hours. The addition of $BF_3$ at room temperature was repeated four times with subsequent heating of the solution for 8, 7, 7, and 16 hours, respectively. The solution was cooled to room temperature, diluted with 200 ml. chloroform, and 2000 ml. methanol was added to precipitate the polymer. The precipitated polymer was removed by filtration, washed with methanol and dried in vacuum at 50° C. to yield a colorless polymer composed of recurring units of the formula XIII 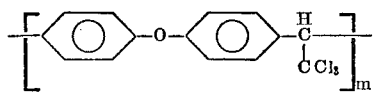

where $m$ is a whole number greater than 1. The elemental analyses on the polymer were as follows:

|  | Found | Theoretical |
|---|---|---|
| Percent: |  |  |
| C | 56.3 | 56.13 |
| H | 2.95 | 3.03 |
| Cl | 35.03 | 35.49 |

Example 8

About 4.8 grams of a diphenylether-chloral polymer having an intrinsic viscosity of 0.27 dl./g. prepared similarly as in Example 7 was dissolved in 30 ml. pyridine and the solution was heated to reflux temperature of the mass for 24 hours. The reaction mixture was cooled and poured into a large quantity of water. The polymer which precipitated was isolated, soaked in hot water four times and then washed with methanol. The polymer thus obtained was dried under vacuum at 50° C. to give about 3.8 grams (about a 90.5% yield) of a dichlorovinylidene polymer composed of recurring structural units of the formula XIV 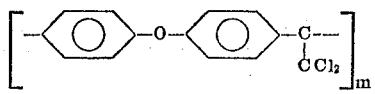

where $m$ is a whole number in excess of 1. This polymer had an intrinsic viscosity in chlorobenzene of 0.030 dl./g.

The following Table I shows the improvements in the thermal stability attained by the dehydrohalogenation reaction. It will also be noted that the glass transition temperature ($T_g$) was lowered by a few degrees.

TABLE I

| Polymer of example number— | TD (° C.)[1] Air | TD (° C.)[1] N[3] | $T_g$[2], ° C. |
|---|---|---|---|
| 2 | 378 (311) | 378 [3] (311) | 101 (116) |
| 4 | 370 (290) | 385 (305) | 99 (117) |
| 5 | 382 (295) | 390 (305) | 111 (126) |
| 8 | 455 (318) | 472 (318) | 169 (212) |

[1] Temperature at which 5% weight loss occurred at heating rate of 10° C./minute.
[2] Determined by differential scanning calorimetry.
[3] Numbers in parentheses are those of precursor polymers.

When an attempt was made to ignite the above-mentioned four polymers, it was found that they were flame resistant and even when ignited, they were self-extinguishing. Instead of exhibiting any drip, the polymers formed stable chars while burning. The oxygen indices of the polymers of Examples 2 and 8 were 29.2 and 56.0, respectively, exceptionally high members. The polymer of Example 8 was additionally treated and found that it had outstanding non-smoke properties, under the National Bureau of Standard tests, this polymer showed a minimum light transmission (through smoke) of 73%, indicating one of the lowest maximum smoke density values encountered.

Mechanical tests were conducted on the polymer of Examples 2 and 8 based on compression molded samples. The results of these tests are as follows:

TABLE II

|  | Polymer of example 2 | Polymer of example 8 |
|---|---|---|
| Flexural modulus (p.s.i.) | 4.9×10⁵ | 4.26×10⁵ |
| Flexural strength (p.s.i.) | 16.9×10³ | 18.1×10³ |
| Notched Izod impact strength (ft. lb.) | 0.50 |  |

Example 9

About 0.888 gram of a diphenylether-chloral polymer as in Example 7 was dissolved in 20 ml. toluene, together with 5 grams anhydrous potassium carbonate and 0.05 ml. of DBN. The mixture was stirred and heated at the reflux temperature of the mass for about one hour. The reaction mixture was then filtered and the inorganic precipitate was washed with toluene and the combined filtrate and the wash water were added to methanol. The white polymer which precipitated was collected by filtration, dried under vacuum to give 0.75 gram (96.4% yield) of a polymer composed of recurring structural units of formula XIV.

It has also been found that 18-membered cyclic ethers containing nitrogen atoms have specific complexing ability toward alkali metals ions, notably sodium and potassium, making them useful as catalysts for the dehydrohalogenation of the aforementioned polymers of formula III. The complex of the aforesaid cyclic ether with the metallic ions solubilizes salts of such ions and dissociates well in non-polar organic solvents. In addition to such cyclic ether amines enhancing the rate of dehydrohalogenation, they can be readily recovered from reaction mixtures in close to quantitative yield thus contributing to the economic aspects of any process using such cyclic ethers. Such nitrogen-containing cyclic ethers may be designated by the general formula

XV

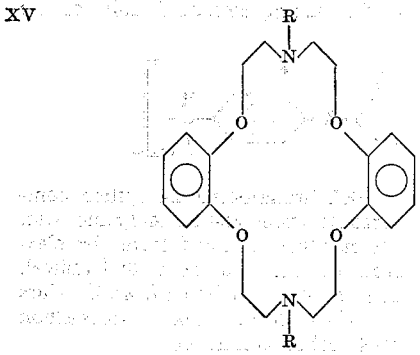

where R is a monovalent saturated aliphatic hydrocarbon of from 1 to 6 carbon atoms, for example, methyl, ethyl, propyl, butyl, isobutyl, cyclohexyl, etc.

The following example shows a means for preparing such a cyclic ether.

Example 10

14.70 grams (0.0477 mol) 1,2-bis(2-n-butylaminoethoxy)benzene [obtained from the reaction of 1,2-bis(2-chloroethoxy)benzene and n-butylamine] and 11.21 grams (0.0477 mol) 1,2-bis(2-chloroethoxy)benzene were dissolved in 120 ml. of N-methylpyrrolidone. The solution was heated under nitrogen at 120–125° C. for 1 hour and then 5 grams anhydrous sodium carbonate was added and the solution was further heated at 120–125° C. for 16 hours. Three portions of sodium carbonate (3 grams each) were then added at one hour intervals for a total heating time of 20 hours. The solvent was removed under vacuum, and the residue dissolved in toluene and the solution washed with water. The toluene solution was evaporated to leave a semi-solid which was triturated with ethanol. The crystalline precipitate which was obtained was filtered and recrystallized from cyclohexane to give the crown ether of formula XV where R is n-butyl in an amount equal to 8.19 grams (36.7% yield). The melting point of this product was 151–152° C. The structure of this crown ether compound was established by the analyses for the elements which were as follows:

| Percent: | Found | Calculated |
|---|---|---|
| C | 71.1 | 71.5 |
| H | 8.8 | 9.00 |
| N | 6.0 | 5.95 |

Example 11

Using 0.5 gram of the amino crown ether of Example 10, 75.45 grams of the diphenylether-chloral polymer of Example 7 was dissolved in 250 ml. toluene together with 40.5 grams of a 50% aqueous solution of sodium hydroxide, 0.5 gram phenol and 27 grams sodium hydroxide pellets. The mixture was stirred under a nitrogen atmosphere and heated at the reflux temperature of the mass to 108° C. for about 150 minutes. The solution was cooled, the organic layer was separated, washed with 0.1 N hydrochloric acid. The organic layer was poured into methanol and stirred causing the polymer to precipitate. The latter polymer was filtered, washed with methanol and dried to give 65.31 grams (98.4% yield) of the dehydrochlorinated polymer composed of recurring structural units of formula XIV. The aqueous acid extract was washed with toluene, and made basic with sodium hydroxide. The basic solution was extracted with chloroform using two quantities of 50 ml. each time, the chloroform solution was washed with water and evaporated to dryness. The white crystals of the initial crown amino ether was obtained as the residue in a yield of about 0.048 gram (80.4% yield), indicating the ease with which the amino crown ether can be recovered.

The compositions of the present invention have application in a wide variety of physical shapes and form, including the use as films, molding compounds, coatings, etc. When used as films or when made into molded products, these polymers, including laminated products prepared therefrom, possess good physical properties. Films formed from the polymeric compositions of this invention may be used in applications where films have been used previously. Thus, the compositions of the present invention can be used in automobile applications for decorative and protective purposes, as dielectric capacitors, as coil and cable wrappings (form wound coil insulation for motors), for containers and container linings; in laminating structures where films of the present composition or where solutions of the claimed compositions of matter are applied to various heat-resistant or other type of materials such as asbestos, mica, glass fiber and the like and superposing the sheets one upon the other and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the compositions of the present invention as overcoats on other types of insulation is not precluded.

Applications which recommend these polymers (which advantageously have an intrinsic viscosity $[\eta]$ of at least 0.15 dl./g. when measured in $CHCl_3$) include their use as binders for asbestos fibers, carbon fibers, and other fibrous materials in making brakelinings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as epoxy resins, phenolaldehyde resins, urea-aldehyde resins, alkyd resins, etc.; cellulostic material such as paper, inorganic and organic esters of cellulose such as cellulose acetate; cellulose ether, such as methyl cellulose, ethyl cellulose benzyl cellulose, etc. In some instances, plasticizers and other modifying agents may be used in combination with the claimed polymers. These polymers, including low molecular weight products, are useful themselves or as additives to other polymers for producing products having low flammability.

It will, of course, be apparent to those skilled in the art that in addition to the dichlorovinylidene arylene compositions specifically referred to in the foregoing examples, other polymers including dibromovinylidene arylene polymers, solvents, catalysts, etc., many examples of which have been described above, may be employed without departing from the scope of the invention. The processing techniques may be varied widely employing the many conditions recited previously.

What I claim as new and desired to secure by Letters Patent of the United States is:

1. A polymer composed of recurring units of the formula

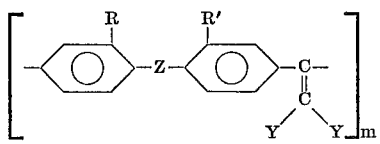

where R and R' are members selected from the class consisting of hydrogen, halogen, and the methyl radical, Z is a direct bond or is a member selected from the class consisting of —O— —S—, the

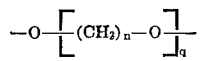

radical, and divalent radicals of the general formula

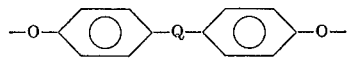

where Y is chlorine or bromine, Q is a member of the class of —O—, —S—, —SO$_2$—, >C=O and divalent alkyl radicals of from 1 to 4 carbon atoms, m is a whole number in excess of 1, and n and q are whole numbers from 1 to 2, inclusive.

2. A polymer as in claim 1 composed of recurring structural units of the formula

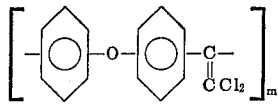

where m is a whole number greater than 1.

3. A polymer as in claim 1 composed of recurring structural units of the formula

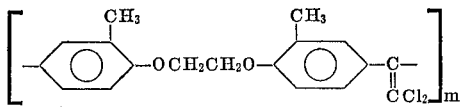

where m is a whole number greater than 1.

4. A polymer as in claim 1 composed of recurring structural units of the formula

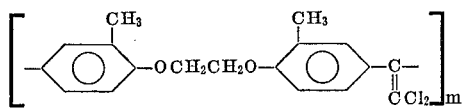

where m is a whole number greater than 1.

5. A polymer as in claim 1 composed of recurring structural units of the formula

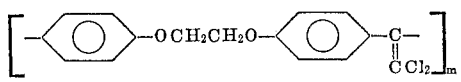

where m is a whole number greater than 1.

6. The process for making polymers composed of recurring structural units of the formula

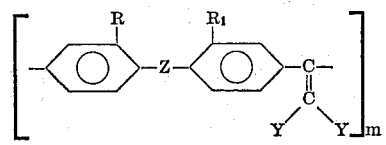

which process comprises dehydrohalogenating a precursor polymer composed of recurring structural units of the formula

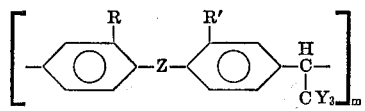

in the presence of a dehydrohalogenating system composed of a tertiary organic amine and an inorganic base, where R and R' are members selected from the class consisting of hydrogen, halogen and the methyl radical, Z is a direct bond or is a member selected from the class consisting of —O—, —S—, divalent alkyl hydrocarbon radicals of from 1 to 4 carbon atoms, the

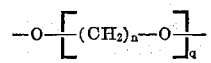

radical, and divalent radicals of the general formula

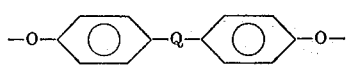

where Y is chlorine or bromine, Q is a member of the class of —O—, —S—, —SO$_2$—, >C=O and divalent alkyl radicals of from 1 to 4 carbon atoms, and m is a whole number in excess of 1.

7. The process as in claim 6 wherein the precursor polymer is obtained from the reaction of chloral and 1,2-bis(2-methylphenoxy) ethane.

8. The process as in claim 6 wherein the precursor polymer is one obtained from the reaction of chloral and 1-phenoxy-2-(2-methylphenoxy) ethane.

9. The process as in claim 6 wherein the precursor polymer is obtained from the reaction of chloral hydrate and diphenyl ether.

10. The process as in claim 6 wherein the dehydrohalogenating system is a tertiary amine and sodium carbonate.

11. The process as in claim 6 wherein the dehydrohalogenating system is a nitrogen-containing cyclic ether and an alkali-metal hydroxide.

12. The process as in claim 6 wherein the dehydrohalogenation is carried out in aqueous solution of an alkali-metal hydroxide and a phenol.

References Cited

UNITED STATES PATENTS 3,391,116    7/1968    Van der Haun _____ 260—52

OTHER REFERENCES

Journal of American Chem. Soc., vol. 69, 1947, pp. 1172–1173, Niederl et al.

HOWARD E. SCHAIN, Primary Examiner

U.S. Cl. X.R.

117—132 BF, 161 L; 161—198, 205, 257; 260—14, 17.2, 38, 49, 67 A, 67 S, 831, 834